March 1, 1949.  L. B. M. BUCHANAN  2,463,498
ANTIHUNTING SERVO CONTROL SYSTEM
Filed Nov. 27, 1945  2 Sheets-Sheet 1
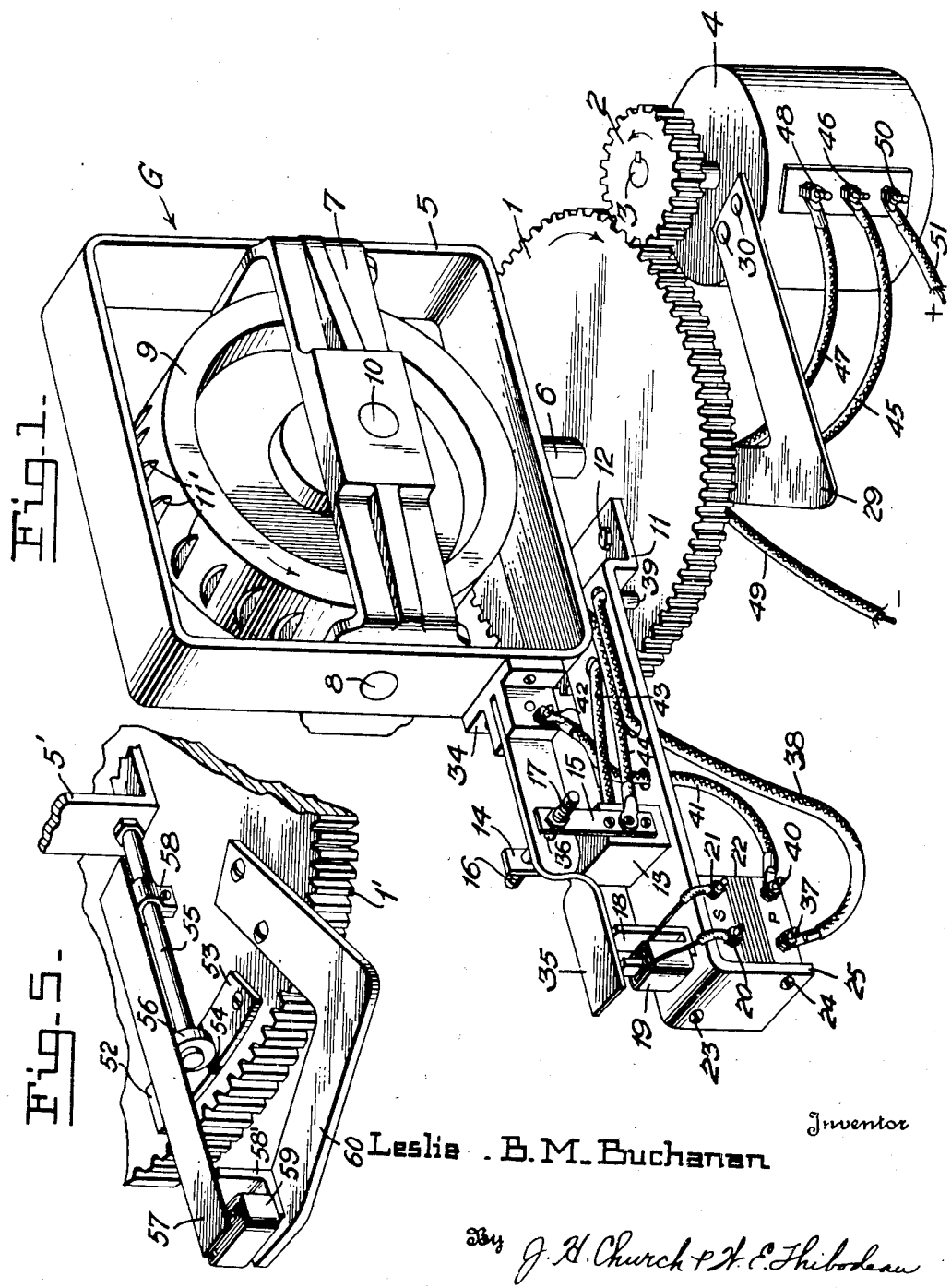
Inventor
Leslie B. M. Buchanan
By J. H. Church & W. E. Thibodeau
Attorneys March 1, 1949.　　　　　L. B. M. BUCHANAN　　　　　2,463,498
ANTIHUNTING SERVO CONTROL SYSTEM
Filed Nov. 27, 1945　　　　　　　　　　　　　　2 Sheets-Sheet 2
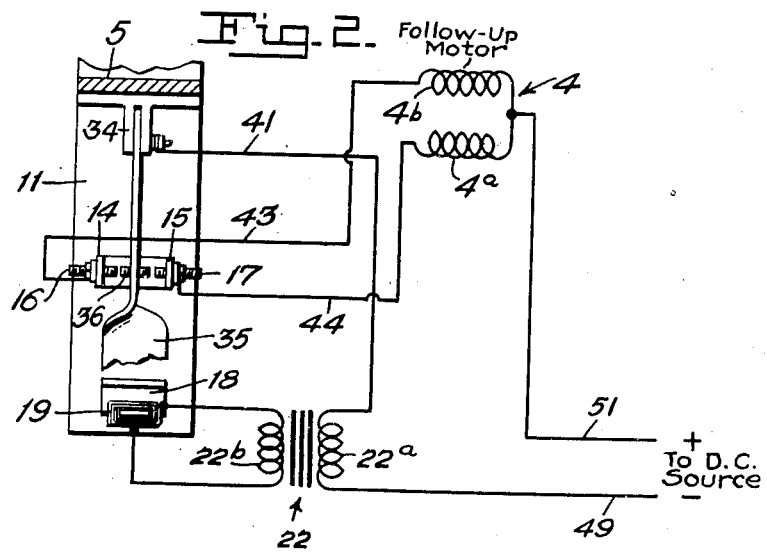
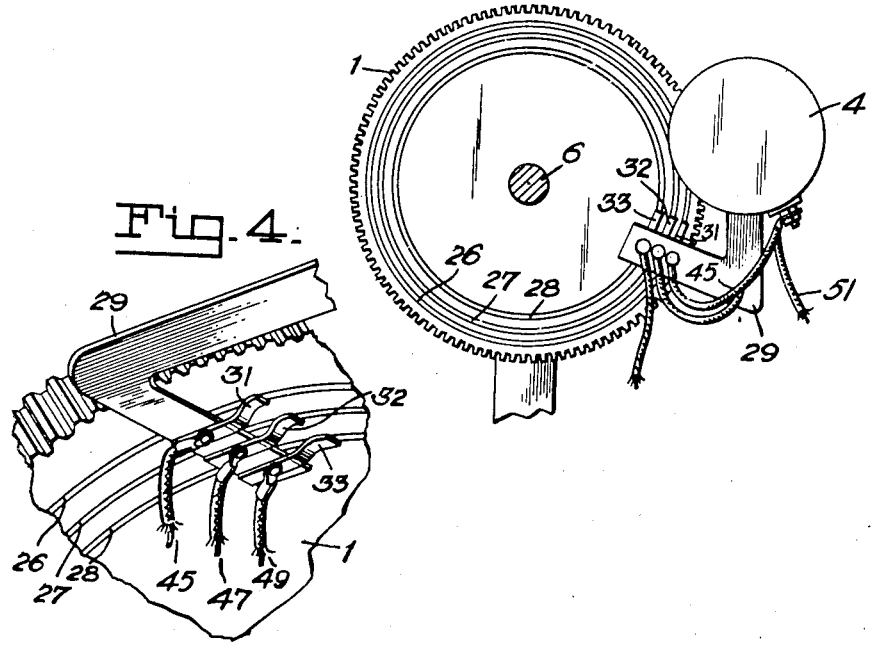
Inventor
Leslie B. M. Buchanan
By J. H. Church & H. E. Thibodeau
Attorneys Patented Mar. 1, 1949

2,463,498

UNITED STATES PATENT OFFICE 2,463,498

ANTIHUNTING SERVO CONTROL SYSTEM

Leslie B. M. Buchanan, Wilbraham, Mass., assignor to Westinghouse Electric Corporation, East Pittsburgh, Pa., a corporation of Pennsylvania Application November 27, 1945, Serial No. 631,127

13 Claims. (Cl. 318—31)

1

This invention relates to follow-up mechanisms. In certain types of instruments it is necessary to move a relatively heavy follow-up element by a separate source of power under the control of a sensitive element that is moved by forces insufficient to directly move the follow-up. Well known examples are the movement of large surfaces such as ailerons, rudders, and elevators of aircraft in response to the angular movement of the ship relatively to a small gyroscope, the speed control of a large pump valve by a small pilot valve, the control of a ship's steering mechanism under the control of a compass, and the control in azimuth of a rotatable tank turret under the control of a directional gyroscope.

Such follow-ups may include the sensitive element proper, e. g., a gyroscope, thermostat, sight, compass, clock, pressure gage, etc., which, in turn, effects the closure of one or the other of a pair of electrical reversing contacts. A reversible follow-up or servo-motor is energized by said contacts and is mechanically connected to the follow-up element to so move the same in the direction necessary to break the contact and open the motor circuit. Numerous modifications are known including those wherein the electrical contacts or "pick-off" are replaced by pneumatic, inductive, photo-electric and other types. In all cases, however, movement of the sensitive element relatively to the follow-up element acts to control or energize a source of power so connected to the follow-up element as to move the same into coincidental or predetermined position with the sensitive element.

The systems just described have the inherent drawback that the momentum inevitable in the moving parts of the follow-up motor and its connection to the follow-up element, acts to cause the parts to "overshoot" and to thereby close the opposite contacts with a result that the motor reverses rapidly and repeatedly to cause the follow up element to oscillate or "hunt" through a relatively small range of movement. This reversal of the follow-up motor may, and often does, occur several times a second.

"Hunting" is useful in certain types of instruments. For example, in gyroscopic compasses, it serves to break down the static friction of the bearings and hence increases the sensitivity of the instrument. In other types of instruments or devices, such as an automatically stabilized gun platform or turret, hunting is undesirable and should be suppressed as much as possible. While it is a relatively simple matter to suppress hunting, heretofore, this has been done at the expense of sensitivity of the follow-up.

It is therefore an object of the invention to provide a follow-up or servo-motor control in which hunting is largely suppressed, or entirely

2 eliminated, without the sacrifice of sensitivity or rapidity of response.

A further object is to provide a follow-up control that is relatively simple and inexpensive to construct while at the same time affording a high degree of sensitivity and one that is capable of general application in the follow-up or servo-motor art.

Other objects and advantages will become apparent as the description proceeds.

In the drawing:

Figure 1 is a perspective view of one form of the invention shown, merely by way of example, as operating in conjunction with a directional gyroscope, Figure 2 is a wiring diagram of the instrument shown in Figure 1, Figure 3 is a plan view of the bottom surface of the main gear of Fig. 1 and illustrating the relative locations of the slip rings, brushes, and follow-up motor.

Figure 4 is a perspective view of the under side of a portion of the main gear showing the slip rings, brushes, and holder, and Figure 5 is a perspective view of a modified form of the invention wherein a trolley and insulated plates replace the contacts of Fig. 1.

Referring in detail to the drawing and particularly to Fig. 1, the numeral 1 identifies a rotatable main gear in mesh with a pinion 2 keyed to the shaft 3 of a reversible follow-up motor 4. A sensitive element is shown in the form of a directional gyroscope G having a vertical ring 5 carried by a shaft or trunnion 6 that is coaxial of gear 1 and rotatable relatively thereto. A horizontal gimbal ring 7 is journaled within ring 5 on suitable aligned trunnions one of which is indicated at 8. A rotor 9 is journaled by and within ring 7, for spinning about a normally horizontal axis indicated at 10. The rotor is shown as being driven by means of air jets impinging upon pockets 11 formed in the rim of rotor 9. However, it will be clear that electrical spinning means may be substituted, if desired, and that, in general, any element movable about the axis of trunnion 6 in response to a change in a measurable value or quantity, may replace the gyroscope. In the particular example shown it might be desired, for example, to operate a steering mechanism or tank turret from gear 1, under indirect control of the gyroscope.

An arm 11 is secured to and extends generally radially of gear 1, as by means of screws 12. An insulating block 13 is secured to arm 11 and has metallic strips 14 and 15 secured thereto and extending upwardly from opposite sides thereof. Aligned contact screws 16 and 17, are adjustably carried by the strips 14 and 15, respectively, whereby the separation of the adjacent inner or contact ends of the screws may be varied.

A small U-shaped core 18 of magnetic material is fixed to the top of arm 11 adjacent the free end thereof and has an energizing winding 19 wound upon one leg thereof. The ends of the winding are connected to the secondary terminals 20 and 21, respectively, of a transformer 22, secured by means of screws 23 and 24, to the depending end 25 of arm 11.

The gear 1 may be of fibre and concentric slip rings 26, 27 and 28 are secured to its under side. It will be understood that motor 4 is fixed to the frame of the instrument, or otherwise secured in position. A bracket 29 has one end fixed to the motor casing, as at 30, Fig. 1, while its other end extends substantially radially beneath gear 1. This bracket may be of insulating material or may have an insulating block, not shown, attached thereto. In either case, spring brushes 31, 32 and 33 are affixed to the radial portion of bracket 29, and each is positioned with its free end resiliently engaging a respective one of the slip rings 26, 27 and 28.

From Fig. 1 it will be noted that ring 5 has an insulating block 34 attached to one side thereof and that said block has a contact arm 35 fixed thereto. This arm carries a double ended contact 36 (see Fig. 2) that is normally positioned with its ends slightly separated from both contact screws 16 and 17 but which may make contact with either upon slight relative rotation between arms 11 and 35. Arm 35 may have a separate armature secured thereto, or, as shown at Fig. 1, may be twisted through 90° about its longitudinal axis to form an armature portion extending over and closely adjacent the ends of core 18 so as to be attracted thereby upon energization of winding 19.

As shown upon Figs. 1 and 2, one primary terminal 37 of transformer 22, is connected by a conductor 38 to the inner slip ring 28, by way of a lead 39 extending through gear 1. The other primary terminal 40 is connected by a lead or conductor 41, to contact arm 35, as at 42. The strip 14 carrying contact 16, is connected by lead 43 to slip ring 27, through an aperture in gear 1. Likewise strip 15 carrying contact 17, is connected by a lead 44 to outer slip ring 26 through an aperture in gear 1. Brush 31, in contact with ring 26 is connected by a lead 45 to a reversing terminal on motor 4. When current flows through this lead, the proper field coil of motor 4 is energized to cause the motor to rotate counterclockwise as viewed upon Fig. 1. Brush 32, in contact with ring 27 is connected by a lead 47 to motor terminal 48. When current flows through the latter, the other field coil of motor 4 is energized to effect clockwise rotation as seen upon Fig. 1. The brush 33 in contact with inner ring 28, is connected by lead 49 to the negative side of the D. C. power supply. The return side of the circuit from motor 4 is by way of terminal 50 and lead 51 to the positive side of the current supply.

The operation of the invention will now be clear. Suppose for example, that the species of Fig. 1 is being used to stabilize in azimuth the turret of a tank. In that event, gear 1 will be so connected to the operating or rotating mechanism of the turret as to rotate in 1 to 1 relation therewith and in the same sense. Motor 4 will be fixed to the tank proper. With the turret properly oriented, that is, turned in azimuth to a desired position relatively to the cardinal directions, contact 36 will be in the position shown at Fig. 2 and the motor 4 will be at rest. In case the moving tank changes its heading by a small amount to the right, for example, gear 1, arm 11, and the parts carried thereby, are thereby correspondingly rotated. Since the gyroscope tends to maintain its spin axis fixed in azimuth, a relative angular movement is effected between arm 11 and contact arm 35 to thereby bring contacts 17 and 36 into engagement. This closes a circuit from the positive side of the source via conductor 51, field coil 4a of motor 4, line 44, contacts 17 and 36, arm 35, line 41, winding 22a of transformer 22 and line 49 to the negative side of the source. When the tank veers to the left engagement takes place between 16 and 36 and a circuit is closed from the positive side of the line, conductor 51, motor field coil 4b, line 43, contacts 16 and 36, arm 35, line 41, primary transformer coil 22a and line 49 to the negative side of the source. Thus whenever contact is made at 16 or 17, motor 4 is energized to rotate in the proper direction to open the contact and thus maintain arms 11 and 35 in predetermined angular relation and the turret in predetermined angular relation with the vertical plane through the spin axis of the gyroscope.

Ordinarily the normal action of such a follow-up would result in a continuous and rapid reversal of motor 4 as the arm 11 "overshot" in each direction, so that the turret and the gun carried thereby would oscillate or "hunt" through a small angle. This would be particularly objectionable in the situation mentioned because it would tend to introduce inaccuracies in aim of the turret gun or guns.

It will be noted that primary winding 22a is energized each time the motor circuit is closed. During the short period of time after closure and opening of the circuit, while the current is increasing or decreasing in primary 22a, an E. M. F. is induced in secondary 22b and the resulting energization of the electromagnet comprising the parts 18 and 19 acts to momentarily attract and restrain the adjacent portion of arm 35 against movement. Since this phenomenon is effective immediately upon separation of the contacts, as well as upon closure thereof, the result is that overshooting of arm 11 is effectively restrained and hunting is greatly reduced or entirely eliminated. Furthermore, the action in no way affects the sensitiveness of the instrument for the restraining action ceases entirely shortly after the motor circuits are opened as well as when the current therethrough reaches a steady state. In short, the damping or restraining action is effective only for a short period of time after the circuits are made or broken and is effective only when needed.

In Fig. 5-I have shown a modification in which 1' indicates the main gear and 5' the vertical ring of the gyroscope or other sensitive element. Gear 1' carries a pair of contact plates 52 and 53 separated by a narrow strip of insulating material 54. A rod 55 is fixed to project from ring 5' and has a trolley 56 journaled upon the end thereof and adapted to make rolling contact with either of plates 52 and 53 as relative pivotal movement takes place between gear 1' and ring 5'. The normal or neutral position of trolley 56 is over strip 54 and out of contact with both plates 52 and 53.

It will be understood that gear 1' has slip rings as shown and described for gear 1, and that plates 52 and 53 are electrically connected to respective slip rings, while trolley 56 is electrically connected to the third slip ring. A resilient armature blade 57 is secured as by clamp means 58, to rod 55 and projects radially outward and normally slightly out of contact with trolley 56. The end of blade 57 is positioned over the ends of core 58 of an electromagnet having a winding 59 on one leg thereof. This electromagnet is carried at the end of an arm 60 secured to gear 1', and corresponds in purpose and function to electromagnet 18, 19 of Fig. 1. It will be understood that this electromagnet is energized by current induced in the secondary of a transformer, as in the species of Fig. 1. This transformer may be mounted in any convenient position upon gear 1' or arm 60.

The circuit of this species is identical with that of Fig. 1 and the operation is substantially identical except only that when electromagnet 58, 59 is energized it acts not only to attract and restrain blade 57 and thus to prevent hunting, but also may, if desired, be pulled down thereby, into braking engagement with trolley 56, to provide an additional restraining or damping factor.

While I have shown a preferred form of the invention as now known to me, numerous modifications and alterations are possible. For example, instead of attracting strips 35 or 57 into contact with the pole faces of an electromagnet, these strips may consist of copper or aluminum, in which event the eddy currents induced therein by the electromagnet will provide a momentary but effective damping force which disappears shortly after the circuits are opened or the current therein reaches a steady state. Hence I do not wish to be limited to the precise details of construction shown but, on the contrary, reserve all such changes, alterations and substitutions of equivalents as fall within the scope of the subjoined claims.

The term "sensitive element" as used herein and in the claims, includes any part or parts of an instrument responsive to changes in the state or condition of an object or a physical quantity. For example, in Fig. 1, the sensitive element is the gyroscope and parts carried thereby. The term "follow-up" or "follow-up element" refers to any part or parts driven by a separate source of power into coincidence or predetermined spatial relation with respect to the sensitive element. For example, in Fig. 1, the follow-up element is gear 1, and the parts carried thereby and may or may not include the transformer since it is possible to locate this part either on or off arm 11. The term "pick-off" or "pick-off means" is used to signify any parts operated by and upon relative movement between the sensitive and follow-up elements to detect or pick-off such relative movement and bring the separate source of power into operation. In Fig. 1, the pick-off would include contacts 16, 17 and 36.

Having now fully disclosed the invention what I claim and desire to secure by U. S. Letters Patent is:

1. In a follow-up control, a movable sensitive element, a movable follow-up element, power means connected to move said follow-up element into a predetermined normal relation to said sensitive element pick-off means effective to energize said power means in response to relative movement of said elements from said normal relation, and electromagnetic damping means carried by one said element and effective upon the other, said damping means being momentarily energized only by and upon said pick-off means becoming operative and inoperative.

2. In a follow-up system, a movable follow-up element, a movable sensitive element, a motor connected to move said follow-up element relatively to said sensitive element, a pick-off carried by said elements and connected to energize said motor on departure of said elements from predetermined spatial relation to thereby restore said relation, electromagnet means on one said element adapted when energized, to attract an armature upon the other said element, and means rendered effective by and upon energization and de-energization of said motor to energize said electromagnet means momentarily only.

3. A follow-up control comprising a sensitive element rotatable about an axis, a follow-up element rotatable about said axis, a motor connected to rotate said follow-up element about said axis, electrical circuits connected to operate said motor in respectively opposite directions of rotation, said circuits including first and second spaced contacts on one said element and a third contact on the other said element between and adapted to engage either of said first or said second contacts on departure of said elements from a predetermined angular relation, an electromagnet on one said element, an armature on the other element in position to be attracted by and upon energization of said electromagnet, and means responsive to closure and opening of said circuits by said contacts to energize said electromagnet and momentarily damp said elements against relative rotation about said axis.

4. In a follow-up system, a sensitive element, a follow-up element, said elements being rotatable about a common axis, an electric motor connected to rotate said follow-up element, reversing circuits for said motor and including first and second spaced contacts on one said element and a third contact on the other of said elements and interposed between but out of engagement with said first and second contacts when said elements are in a predetermined angular relation, an electromagnet carried by one said element, a coacting armature carried by the other said element, and means including a transformer energized by and in response to opening and closure of said motor circuits to momentarily energize said electromagnet and thereby attract said armature and temporarily restrain said elements against relative rotation.

5. A follow-up system comprising a sensitive element and a follow-up element said elements being relatively rotatable about an axis, a reversible motor connected to drive said follow-up element, a transformer, reversing circuits for said motor including spaced first and second contacts on said follow-up element and a third contact on said sensitive element positioned to engage either of said first and second contacts to effect a respective direction of rotation of said motor, on departure of said elements from a predetermined angular relation, said circuits also including the primary of said transformer, an electromagnet carried by said follow-up, an armature carried by said sensitive element adjacent said electromagnet, and a circuit including in series the winding of said electromagnet and the secondary of said transformer.

6. In a follow-up system adapted to stabilize in azimuth the rotatable turret of a combat vehicle, a directional gyroscope having a ring rotatable about a normally substantially vertical axis, a follow-up element rotatable about said axis, power means connected to drive said follow-up element and said turret, electrical control circuits for effecting respective reverse directions of operation of said power means, said circuits including first and second spaced contacts carried by said element and a third contact carried by said ring and positioned to engage either of said first and second contacts on departure of said ring and element from a predetermined angular relationship about said axis, and means effective to momentarily restrain said ring and element against relative angular movement, said means including a transformer having the energization of its primary controlled by said contacts.

7. In a follow-up control, a sensitive control element and a follow-up element relatively rotatable about a common axis and adapted to be maintained in a predetermined angular relation about said axis, first means responsive to a departure of said follow-up element from said relation to move said follow-up element to restore said relation, and second means responsive to the operation of said first means to damp relative rotation of said elements, said second means including an armature carried by one said element, electromagnetic means carried by the other said element and effective, when energized to attract said armature, and transformer means having its secondary in series circuit with said electromagnetic means and its primary adapted to be energized by direct current under control of said first means.

8. A follow-up control comprising a follow-up element, a sensitive element, said elements being relatively rotatable about a common axis, a motor connected to rotate said follow-up element, circuit closure means carried by said elements and responsive to departure of said elements from predetermined relation to control operation of said motor to restore said relation, an armature carried by one said element, an electromagnet carried by the other said element and effective when energized to attract said armature, a transformer having its secondary connected to energize said electromagnet, and having its primary connected to be energized by a source of direct current under control of said circuit closure means.

9. In a follow-up control, a sensitive element, a follow-up element, said elements being relatively movable in a fixed path, a reversible D. C. motor connected to move said follow-up element in said path, a control circuit for said motor and including circuit closure means carried by said elements and effective to close said circuit on departure of said follow-up element from a predetermined position relatively to said sensitive element along said path to cause said motor to restore said position an electromagnet carried by said follow-up element, an armature carried by said sensitive element in position to be attracted by said electromagnet, a transformer having its secondary in circuit with said electromagnet, the primary of said transformer being in said control circuit for said motor.

10. An anti-hunting control system for follow-ups comprising a follow-up element, a sensitive element, said elements being mounted for relative rotation about a common axis, an armature carried by said sensitive element electromagnet means carried by said follow-up element and adapted, when energized, to attract said armature to restrain said elements against relative rotation, a transformer having its secondary connected to energize said electromagnet, reversible power means connected to rotate said follow-up element, and an electrical circuit for controlling said power means, said circuit including contact means carried by said elements and responsive to departure of said elements from a predetermined angular relation about said axis, and also including the primary of said transformer.

11. In a follow-up system comprising a sensitive element and a follow-up element relatively movable in and along a predetermined path, power means connected to so move said follow-up element, pick-off means carried by said elements and effective to control said power means on departure of said elements from a predetermined relation along said path, said pick-off means comprising a pair of spaced insulated plates on one said element and a trolley on the other said element, said trolley being rotatable over and into contact with either of said plates by departure of said elements from said predetermined relation, brake means operating upon said trolley to retard rotation thereof, and means responsive to contact of said trolley with either plate to momentarily render said brake means effective.

12. In a follow-up, a control element, a follow-up element, direct current power means, a driving connection between said power means and said follow-up element to move said follow-up element in response to movement of said control element, cooperating reversing contact means for said power means connected for movement with said elements respectively, a transformer, circuit means energizing the primary of said transformer in response to closure of said contact means, and means damping relative movement of said contact means in response to current induced in the secondary of said transformer.

13. A follow-up system comprising, a movable control element, a movable follow-up element, power means connected to drive said follow-up element, first and second pick-off parts each positionally controlled by a respective one of said elements, said parts cooperating to control said power means on relative movement between said parts, electromagnetic means operable when energized to restrain relative movement of said parts, a transformer having its secondary connected in circuit with said electromagnetic means, and a direct current circuit including the primary of said transformer and closed in response to predetermined relative movement of said parts.

LESLIE B. M. BUCHANAN.

REFERENCES CITED

The following references are of record in the file of this patent:

UNITED STATES PATENTS

| Number | Name | Date |
| --- | --- | --- |
| 1,725,256 | Claytor | Aug. 20, 1929 |
| 2,014,825 | Watson | Sept. 27, 1935 |
| 2,197,386 | Ross | Apr. 16, 1940 |
| 2,397,819 | Tear | Apr. 2, 1946 |